(12) United States Patent
Rooney, III et al.

(10) Patent No.: US 8,386,112 B2
(45) Date of Patent: Feb. 26, 2013

(54) VESSEL HULL ROBOT NAVIGATION SUBSYSTEM

(75) Inventors: James H. Rooney, III, Harvard, MA (US); Stephen C. Jacobsen, Salt Lake City, UT (US); Fraser Smith, Salt Lake City, UT (US)

(73) Assignee: Raytheon Company, Waltham, MA (US)

( * ) Notice: Subject to any disclaimer, the term of this patent is extended or adjusted under 35 U.S.C. 154(b) by 260 days.

(21) Appl. No.: 12/800,486

(22) Filed: May 17, 2010

(65) Prior Publication Data

US 2011/0282536 A1 Nov. 17, 2011

(51) Int. Cl.
*G01C 22/00* (2006.01)

(52) U.S. Cl. .......... 701/23; 701/408; 701/409; 701/411; 701/447; 701/448; 701/470; 701/471; 701/472; 701/473; 701/460; 701/467; 701/533; 901/1; 901/6; 901/8; 901/10; 114/322; 114/249; 114/222; 700/245; 700/254; 700/302; 700/66; 700/33

(58) Field of Classification Search ............... 701/533, 701/408, 23, 409, 411, 447, 448, 470, 471, 701/472, 473, 500, 460, 467; 901/1, 6, 8, 901/10; 114/322, 249, 222; 700/245, 254, 700/302, 13, 66
See application file for complete search history.

(56) References Cited

U.S. PATENT DOCUMENTS

| 2,104,062 A | 1/1938 | Temple |
| 2,132,661 A | 10/1938 | Temple |
| 2,386,650 A | 10/1945 | Bell |
| 3,088,429 A | 5/1963 | Johannessen |
| 3,285,676 A | 11/1966 | Hetteen |
| 3,439,937 A | 4/1969 | Dixon |
| 3,554,300 A | 1/1971 | Rosenberg |

(Continued)

FOREIGN PATENT DOCUMENTS

| DE | 3611750 | 10/1987 |
| GB | 2038721 A | 7/1980 |

(Continued)

OTHER PUBLICATIONS

U.S. Appl. No. 12/586,248, filed Sep. 18, 2009, Rooney III et al.

(Continued)

*Primary Examiner* — Redhwan k Mawari
(74) *Attorney, Agent, or Firm* — Thorpe North & Western LLP

(57) ABSTRACT

A vessel hull robot navigation subsystem and method for a robot including a drive subsystem onboard the robot for driving the robot about the hull. A sensor subsystem onboard the robot outputs data combining robot and vessel motion. A memory onboard the robot includes data concerning the configuration of the hull and a desired path of travel for the robot. A fix subsystem communicates position fix data to the robot. A navigation processor onboard the robot is responsive to the memory data, the sensor subsystem, the position fix data, and the data concerning vessel motion. The navigation processor is configured to determine the position of the robot on the hull by canceling, form the sensor subsystem output data combining both robot and vessel motion, the determined vessel motion. The navigation processor controls the drive subsystem to maneuver the robot on the hull based on the fix data, the configuration of the hull, the desired path of travel for the robot, and the determined position of the robot on the hull.

22 Claims, 10 Drawing Sheets

U.S. PATENT DOCUMENTS

| | | | |
|---|---|---|---|
| 3,638,600 | A | 2/1972 | Modrey |
| 3,777,834 | A | 12/1973 | Hiraoka et al. |
| 3,922,991 | A | 12/1975 | Woods |
| 3,934,664 | A | 1/1976 | Pohjola |
| 3,946,692 | A | 3/1976 | Sierra et al. |
| 3,960,229 | A | 6/1976 | Shio |
| 3,984,944 | A | 10/1976 | Maasberg et al. |
| 4,046,429 | A | 9/1977 | Pohjola |
| 4,079,694 | A | 3/1978 | Galinou |
| 4,119,356 | A | 10/1978 | Pohjola |
| 4,135,592 | A | 1/1979 | Vincent |
| 4,202,453 | A | 5/1980 | Wilkes et al. |
| 4,251,791 | A | 2/1981 | Yanagisawa et al. |
| 4,401,048 | A | 8/1983 | Rogers |
| 4,574,722 | A | 3/1986 | Orita et al. |
| 4,674,949 | A | 6/1987 | Kroczynski |
| 4,690,092 | A | 9/1987 | Rabuse |
| 4,697,536 | A | 10/1987 | Hirata |
| 4,734,954 | A | 4/1988 | Greskovics et al. |
| 4,736,826 | A | 4/1988 | White et al. |
| 4,789,037 | A | 12/1988 | Kneebone |
| 4,809,383 | A | 3/1989 | Urakami |
| 4,841,894 | A | 6/1989 | Nellessen, Jr. |
| 4,890,567 | A | 1/1990 | Caduff |
| 4,926,775 | A | 5/1990 | Andorsen |
| 5,048,445 | A | 9/1991 | Lever et al. |
| 5,174,222 | A | 12/1992 | Rogers |
| 5,203,646 | A | 4/1993 | Landsberger et al. |
| 5,249,631 | A | 10/1993 | Ferren |
| 5,253,605 | A | 10/1993 | Collins |
| 5,253,724 | A | 10/1993 | Prior |
| 5,285,601 | A | 2/1994 | Watkin et al. |
| 5,366,038 | A | 11/1994 | Hidetsugu et al. |
| 5,435,405 | A | 7/1995 | Schempf et al. |
| 5,628,271 | A | 5/1997 | McGuire |
| 5,849,099 | A | 12/1998 | McGuire |
| 5,852,984 | A | 12/1998 | Matsuyama et al. |
| 5,894,901 | A | 4/1999 | Awamura et al. |
| 5,947,051 | A | 9/1999 | Geiger |
| 6,000,484 | A | 12/1999 | Zoretich et al. |
| 6,053,267 | A | 4/2000 | Fisher |
| 6,064,708 | A | 5/2000 | Sakamaki |
| 6,102,145 | A | 8/2000 | Fisher |
| 6,125,955 | A | 10/2000 | Zoretich et al. |
| 6,317,387 | B1 | 11/2001 | D'Amaddio et al. |
| 6,564,815 | B2 | 5/2003 | McGuire |
| 6,595,152 | B2 | 7/2003 | McGuire |
| 6,698,376 | B2 | 3/2004 | Delahousse et al. |
| 6,792,335 | B2 | 9/2004 | Ross et al. |
| 6,886,486 | B2 | 5/2005 | Van Rompay |
| 6,886,651 | B1 | 5/2005 | Slocum et al. |
| 7,296,530 | B1 | 11/2007 | Bernstein et al. |
| 7,390,560 | B2 | 6/2008 | Wallach |
| 7,520,356 | B2 | 4/2009 | Sadegh et al. |
| 7,866,421 | B2 | 1/2011 | Moore et al. |
| 7,934,575 | B2 | 5/2011 | Waibel et al. |
| 2003/0000445 | A1 | 1/2003 | McGuire |
| 2004/0089216 | A1 | 5/2004 | Van Rompay |
| 2004/0133999 | A1 | 7/2004 | Walton |
| 2005/0027412 | A1 | 2/2005 | Hobson et al. |
| 2005/0156562 | A1 | 7/2005 | Cohen et al. |
| 2005/0216125 | A1 | 9/2005 | Huston et al. |
| 2006/0175439 | A1 | 8/2006 | Steur et al. |
| 2006/0191457 | A1* | 8/2006 | Murphy ................... 114/253 |
| 2006/0249622 | A1 | 11/2006 | Steele |
| 2006/0261772 | A1 | 11/2006 | Kim |
| 2007/0089916 | A1 | 4/2007 | Lundstrom |
| 2007/0276552 | A1 | 11/2007 | Rodocker et al. |
| 2007/0284940 | A1 | 12/2007 | Koolhiran |
| 2008/0202405 | A1 | 8/2008 | Kern |
| 2008/0276407 | A1 | 11/2008 | Schnittman et al. |
| 2008/0281470 | A1 | 11/2008 | Gilbert, Jr. et al. |
| 2009/0078484 | A1 | 3/2009 | Kocijan |
| 2009/0094765 | A1 | 4/2009 | Osaka et al. |
| 2009/0166102 | A1 | 7/2009 | Waibel et al. |
| 2009/0301203 | A1 | 12/2009 | Brussieux |
| 2010/0000723 | A1 | 1/2010 | Chambers |
| 2010/0126403 | A1 | 5/2010 | Rooney, III et al. |
| 2010/0131098 | A1 | 5/2010 | Rooney, III et al. |
| 2010/0217436 | A1 | 8/2010 | Jones et al. |
| 2010/0219003 | A1 | 9/2010 | Rooney, III et al. |
| 2011/0208417 | A1* | 8/2011 | Fink et al. ................... 701/200 |
| 2011/0282536 | A1* | 11/2011 | Rooney, III ................... 701/23 |

FOREIGN PATENT DOCUMENTS

| | | | |
|---|---|---|---|
| WO | WO 02/074611 | A2 | 9/2002 |
| WO | WO 02/074611 | A3 | 9/2002 |
| WO | WO 2005/014387 | A1 | 2/2005 |

OTHER PUBLICATIONS

U.S. Appl. No. 12/587,949, filed Oct. 14, 2009, Komstein et al.

Munk, Torben, Fuel Conservation Through Managing Hull Resistance, Motorship Propulsion Conference, Copenhagen, Apr. 26, 2006 pp. 1-10.

Kohli, Nikita, Biofouling and Design of a Biomimetic Hull-Grooming Tool, Naval Surface Warfare Center Carderock Division, West Bethesda, MD, NSWCCD-CISD-2007/002, Ship Systems Integration & Design Department Technical Report, Sep. 2007, 38 pages total.

HISMAR *Hull Identification System for Maritime Autonomous Robots*, http://hismar.ncl.ac.uk/public_docs/HISMAR_Poster.pdf (1 page).

HISMAR *HISMAR News Report* No. 2. 2008, http://hismar.ncl.ac.uk/public_docs/News_Reports/News%20Report%20No2_UNEW.pdf (4 pages).

S. Reed, A. Cormack, K. Hamilton, I. Tena Ruiz, and D. Lane. "*Automatic Ship Hull Inspection using Unmanned Underwater Vehicles*," Proceedings from the 7th International Symposium on Technology and the Mine Problem. Monterey, USA. May 2006 (10 pages).

Vaganay, J., Elkins, M., Espositio, D., Oapos, Halloran, W., Hover, F., Kokko, M. *Ship Hull Inspection with the HAUV: US Navy and NATO Demonstrations Results*, OCEANS 2006, vol., Issue, Sep. 18-21, 2006, pp. 1-6.

Borchardt, John, Grooming the Fleet, Mechanical Engineering, vol. 132/No. 4 Apr. 2010, pp. 33-35.

Written Opinion of the International Searching Authority for PCT Application No. PCT/US2009/006122 mailed Feb. 3, 2010 (seven (7) pages).

Lee Min Wai Serene and Koh Cheok Wei, "Design of a Remotely Operated Vehicle (ROV) for Underwater Ship Hull Cleaning," National University of Singapore, 2003, pp. 1-6.

Fu-cai et al., "The Design of Underwater Hull-Cleaning Robot," *Journal of Marine Science and Application*, vol. 3, No. 1, Jun. 2004, pp. 41-45.

Townsin, R.L., The Ship Hull Fouling Penalty, Biofouling, Jan. 2003, vol. 19, (supplement), Jan. 1, 2003, pp. 9-15.

Rosenhahn et al., Advanced Nanostructures for the Control of Biofouling: The FP 6 EU Integrated Project AMBIO, Biointerphases 3(1) Mar. 2008, published Feb. 21, 2008; pp. IR1-IR5.

Preiser et al., Energy (Fuel) Conservation Through Underwater Removal and Control of Fouling on Hulls of Navy Ships, Naval Research and Development Center, Materials Department, Annapolis, Research and Development Report, Dec. 1975, 52 pgs.

MAN, B&W, Basic Principles of Ship Propulsion, Basics of Ship Propulsion, pp. 1-30, Apr. 2004.

A Copenhagen Climate Treaty, Version 1.0 Draft, A Proposal for a Copenhagen Agreement by Members of the NGO Community, published Jun. 2009, pp. 1-78 (80 pages total).

Yuan, et al., The Design of Underwater Hull-Cleaning Robot, Journal of Marine Science and Application, vol. 3, No. 1, Jun. 2004, pp. 41-45.

Tallett, et al., Potential Marine Fuels Regulations: Impacts on Global Refining, Costs & Emissions, Joint IFQC & IPIECA Roundtable: Impacts of CO2 Emissions from Refining & Shipping, London, England Oct. 1, 2007, 17 pgs.

RTI International, EnSys Energy & Systems, Inc., Navigistics Consulting; Global Trade and Fuels Assessment—Future Trends and Effects of Designating Requiring Clean Fuels in the Marine Sector: Task Order No. 1, Draft Report, RTI Project No. 0209701.001, Apr. 2006 (82 pages total).

Anti-Fouling Systems, Focus on IMO, International Maritime Organization, UK, 2002, pp. 1-31. http://www.uscg.mil/hq/cg5/cg522/cg5224/docs/FOULING2003.pdf.

Fernandez, Linda, NAFTA and Member Country Strategies for Maritime Trade and Marine Invasive Species, Journal of Environmental Management 89, 2008, pp. 308-321.

U.S. Appl. No. 12/313,643, filed Nov. 21, 2008; James H. Rooney III; office action issued Apr. 13, 2012.

U.S. Appl. No. 12/586,248, filed Sep. 18, 2009; James H. Rooney III; office action issued May 24, 2012.

U.S. Appl. No. 12/587,949, filed Oct. 14, 2009; Howard R. Kornstein; office action issued May 25, 2012.

U.S. Appl. No. 12/800,174, filed May 10, 2010; James H. Rooney, III; office action issued Feb. 24, 2012.

Written Opinion of the International Searching Authority, International Application No. PCT/US2010/002163, Oct. 13, 2010, 5 pgs. (unnumbered).

Written Opinion of the International Searching Authority, International Application No. PCT/US2010/002164, Oct. 8, 2010, 5 pgs. (unnumbered).

Written Opinion of the International Searching Authority, International Application No. PCT/US2011/000787, Jul. 20, 2011, 7 pgs. (unnumbered).

Written Opinion of the International Searching Authority, International Application No. PCT/US2011/000770, Aug. 9, 2011, 5 pgs. (unnumbered).

Written Opinion of the International Searching Authority, International Application No. PCT/US2010/002693, Dec. 9, 2010, 8 pgs. (unnumbered).

U.S. Appl. No. 12/313,643, filed Nov. 21, 2008; James H. Rooney III; office action dated Sep. 17, 2012.

U.S. Appl. No. 12/587,949, filed Oct. 14, 2009; Howard R. Kornstein; notice of allowance dated Sep. 21, 2012.

U.S. Appl. No. 12/583,346, filed Aug. 19, 2009; James H. Rooney III; office action dated Sep. 25, 2012.

U.S. Appl. No. 12/800,174; dated May 10, 2010; James H. Rooney III; notice of allowance dated Aug. 17, 2012.

* cited by examiner

VESSEL HULL ROBOT NAVIGATION SUBSYSTEM

RELATED APPLICATIONS

This application is related to co-pending application, U.S. patent application Ser. No. 12/313,643 filed Nov. 21, 2008.

FIELD OF THE INVENTION

The subject invention relates to a hull robot typically configured to clean and/or inspect the hull of a vessel.

BACKGROUND OF THE INVENTION

The frictional resistance of a vessel hull as it moves through the water can constitute 45% to 90% of the total resistance and may be increased by 6% up to 80% due to the fouling of the hull by algae, sea grass, barnacles, and the like. An added resistance of 30% due to moderate bio-fouling of a tanker hull can increase the fuel consumption of the vessel by twelve tons per day. The result is added cost to operate the vessel and increased emissions.

Accordingly, there are a variety of methods employed to lower the chance of bio-fouling and/or to clean the hull of vessels. For example, hull paints and coatings are used in an effort to decrease the chance of bio-fouling, but such treatments do not always work reliably. See, for example, U.S. Pat. No. 7,390,560 incorporated by reference herein. Also, the vessel must be dry docked for an extensive period of time while the paint and/or coating is applied. There are also environmental concerns with anti-fouling paints and coatings.

So, typically, while the ship is dockside and/or during normal unloading conditions, the hull is periodically cleaned manually by scuba divers using motorized brushes. The cost of such a cleaning procedure is high. This type of cleaning effort is repeated approximately every ten to twenty months or sooner if needed. Worse, some jurisdictions have made this practice illegal due to the toxicity of anti-fouling paint which contaminates the water.

In response, robotic hull cleaners have been proposed. The "Hismar" consortium, for example, has proposed a robotic platform for hull cleaning during normal unlading conditions. The robot is magnetically attached to the hull when the vessel is stationary and is tethered to an operator control unit, a high pressure water source, a suction subsystem, and a power subsystem.

Other tethered robots are disclosed in U.S. Pat. Nos. 5,628,271; 6,317,387; 4,674,949; 4,401,048; 4,079,694; 3,946,692; and 3,638,600. See also WO 02/074611; "Design of a Remotely Operated Vehicle (ROV) for Underwater Ship Hull Cleaning," by Lee Min Wai Serene and Koh Cheok Wei; and "The Design of Underwater Hull-Cleaning Robot," by Fu-cai et al., published in *The Journal of Marine Science and Application*, Vol. 3, No. 1, June 2004. All of these references are hereby incorporated by reference herein.

Most prior hull cleaning robots suffer from several shortcomings. Typically, the robots are connected to a cable and powered and controlled by an on-board power supply and control subsystem and are able to operate only on a stationary vessel.

Navigation of a hull robot as proposed in the prior art includes using a three-dimensional laser mapping system, gyroscopic devices, lidar cameras, acoustic transceivers, and the like. See U.S. Pat. Nos. 5,947,051 and 6,317,387 incorporated herein by this reference.

BRIEF SUMMARY OF THE INVENTION

In the applicant's co-pending application, U.S. patent application Ser. No. 12/313,643, filed Nov. 21, 2008 and incorporated herein by this reference, a hull robot includes one or more turbines powering the robot drive and cleaning subsystems. The turbines are activated by water flowing past the hull when the vessel is underway. Because the available power is somewhat limited in such a system, complicated, high power navigation systems are not optimal. Also, to keep the cost of the system down, expensive navigation systems are not preferred.

Programming the robot in advance to maneuver about the hull autonomously according to a planned route could also be problematic as the robot's position may shift over time, for example, as waves, hydrodynamic forces, and navigation drift affect the robot's position on the hull. Highly accurate guidance and navigation systems are expensive and consume a fair amount of power. Moreover, while the vessel is underway it pitches, rolls and yaws in many directions complicating the navigation challenge.

In accordance with one aspect of the invention, shifts in the robot's position on the hull are accounted for and the accumulated inaccuracies inherent in the navigation system are addressed by programming the robot to periodically maneuver to a position on the hull to receive a position calibration fix. To account for the motion (pitch, roll and yaw) of the vessel while it is underway, the robot is also programmed to subtract the motion of the vessel from its navigation calculations. In this way, the robot's position on the hull can be determined after it leaves the position calibration fix point.

In one example, the result is a lower cost, lower power navigation subsystem.

The invention features a vessel hull robot navigation subsystem and method. A drive subsystem onboard the robot is for driving the robot about the hull. A sensor subsystem onboard the robot outputs data combining robot and vessel motion. A memory onboard the robot includes data concerning the configuration of the hull and a desired path of travel for the robot.

A fix subsystem communicates position fix data to the robot. There are also means for determining vessel motion. A navigation processor onboard the robot is responsive to the memory data, the sensor subsystem, the position fix data, and the means for determining the vessel motion. The navigation processor is configured to determine the position of the robot on the hull by canceling, from the sensor subsystem output data combining both robot and vessel motion, the determined vessel motion. The navigation processor controls the drive subsystem to maneuver the robot on the hull based on the fix data, the configuration of the hull, the desired path of travel for the robot, and the determined position of the robot on the hull.

In one example, the navigation processor is furthered configured to control the drive subsystem to periodically maneuver the robot above the water line to receive the position fix data. The robot further may include a pressure sensor for detecting when the robot is above the water line.

The fix subsystem typically includes at least two hull mounted transmitters and a receiver onboard the robot receiving transmissions from the at least two hull transmitters. The navigation processor is responsive to the receiver and is configured to determine, by triangulation, robot position fix data based on the transmissions transmitted by the at least two hull transmitters.

The means for determining vessel motion may include a multi-axis inertial sensing subsystem on the vessel outputting data representing motion of the vessel, a transmitter on the vessel for transmitting said data, and a receiver on the robot for receiving this data. In another version, the means for determining vessel motion includes the sensor onboard the robot outputting vessel motion data alone when the robot is not moving. In this version, the navigation processor is typically configured to periodically stop movement of the robot to acquire the vessel motion data.

The sensor subsystem onboard the robot may also include an odometer for determining the distance traveled by the robot. Typically, the sensor subsystem is configured to output angular rotations about a plurality of axes and position angles with respect to a plurality of axes.

One example of a vessel hull robot navigation subsystem in accordance with the invention includes a sensor subsystem onboard the robot outputting robot motion data, a memory onboard the robot including data concerning the configuration of the hull and a desired path of travel for the robot, a fix subsystem communicating position fix data to the robot, and a navigation processor onboard the robot and responsive to the memory data, the sensor subsystem, and the position fix data. The navigation processor is configured to maneuver the robot on the hull based on the fix data, the configuration of the hull, the desired path of the travel for the robot, and the determined position of the robot on the hull.

One example of a vessel hull robot navigation subsystem includes a sensor subsystem onboard the robot outputting data combining robot and vessel motion, a memory onboard the robot including data concerning the configuration of the hull and a desired path of travel for the robot, means for determining vessel motion, and a navigation processor onboard the robot and responsive to the memory data, the sensor subsystem, and the means for determining the vessel motion. The navigation processor is configured to determine the position of the robot on the hull by canceling from the sensor subsystem output data combining both robot and vessel motion, the determined vessel motion, and control the drive subsystem to maneuver the robot on the hull based on the configuration of the hull and the desired path of travel for the robot, and the determined position of the robot on the hull.

One vessel hull robot navigation subsystem includes a sensor subsystem onboard the robot outputting data combining robot and vessel motion, a fix subsystem communicating position fix data to the robot, means for determining vessel motion, and a navigation processor onboard the robot and responsive to the sensor subsystem, the position fix data, and the means for determining the vessel motion. The navigation processor is configured to determine the position of the robot on the hull by canceling, from the sensor subsystem output data combining both robot and vessel motion, the determined vessel motion, and maneuver the robot on the hull based on the fix data and the determined position of the robot on the hull. Further included may be a memory onboard the robot including data concerning the configuration of the hull and a desired path of travel for the robot. The navigation processor is responsive to the memory data and configured to control the drive subsystem to maneuver the robot based on the configuration of the hull and the desired path of travel for ht robot.

A vessel hull robot navigation method, in one example, includes sensing robot motion, and vessel motion, storing data concerning the configuration of the hull and a desired path of travel for the robot, communicating position fix data to the robot, determining vessel motion determining the motion of the robot on the hull by canceling vessel motion from the sensed robot and vessel motion, and maneuvering the robot on the hull based on the fix data, the configuration of the hull, the desired path of travel for the robot, and the determined position of the robot on the hull.

The method may further include controlling the drive subsystem to periodically maneuver the robot above the water line to receive the position fix data. The method may further include sensing pressure to detect when the robot is above the water line.

Communicating fix data may include installing at least two hull transmitters and determining, by triangulation, robot position fix data based on the transmissions transmitted by the at least two hull transmitters.

Determining vessel motion may include installing a multi-axis inertial sensing subsystem on the vessel outputting data representing motion of the vessel and transmitting this data to the robot. Determining vessel motion could also include periodically stopping movement of the robot to acquire vessel motion data. Sensing robot motion may further include determining the distance traveled by the robot.

In one example, a vessel hull robot navigation method includes sensing data combining robot and vessel motion, communicating position fix data to the robot, determining vessel motion, determining motion of the robot on the hull by canceling vessel motion from the data combining both robot and vessel motion, and maneuvering the robot on the hull based on the fix data and the determined position of the robot on the hull.

The subject invention, however, in other embodiments, need not achieve all these objectives and the claims hereof should not be limited to structures or methods capable of achieving these objectives.

BRIEF DESCRIPTION OF THE SEVERAL
VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
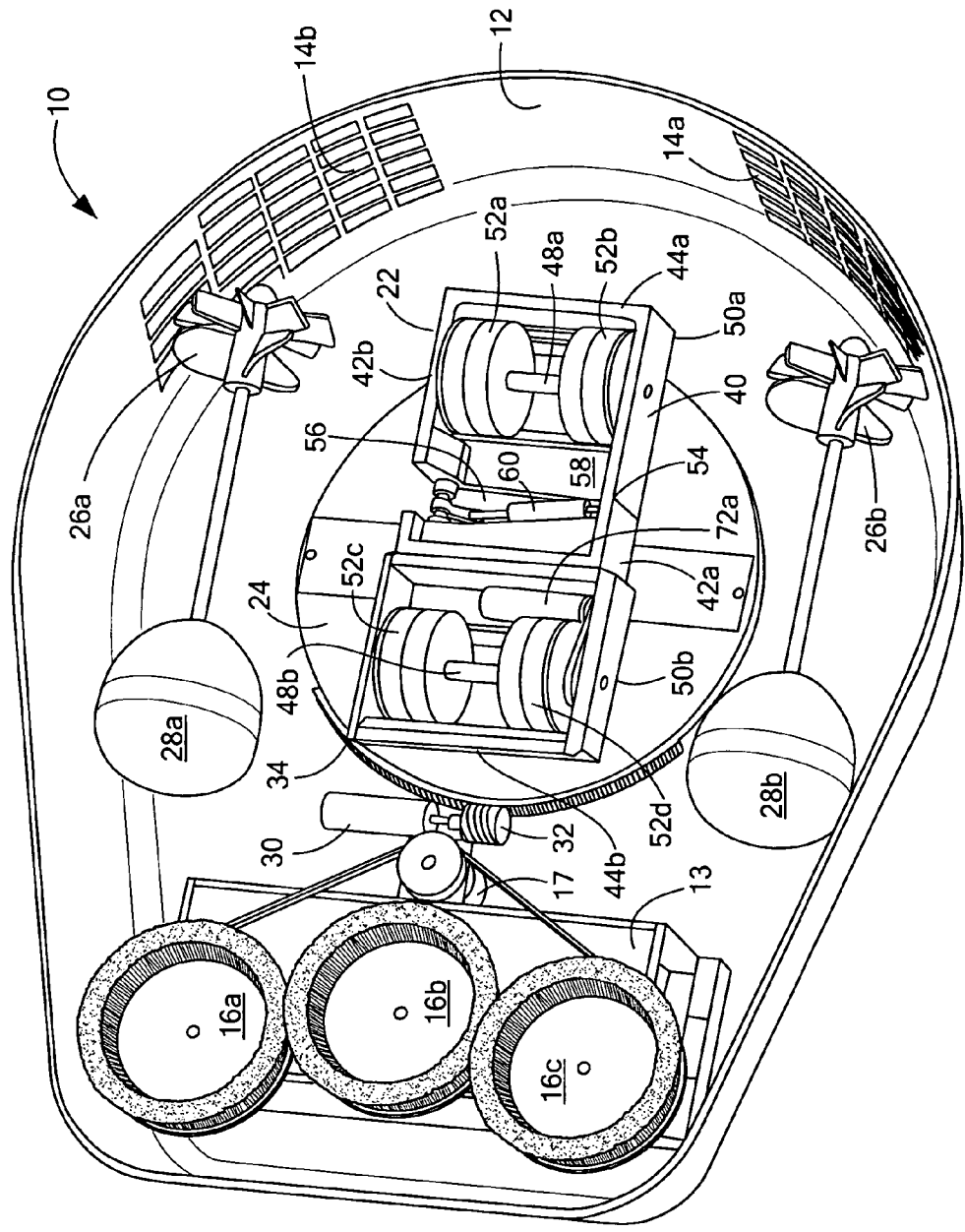
FIG. 1 is a schematic bottom view showing an example of a hull robot in accordance with the invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 shows an example of robot 10 including robot body 12 with turbine intake vents 14a and 14b. Cleaning brushes 16a, 16b, and 16c are also shown driven by motor 17. A magnetic drive system 22 is typically used to adhere the robot to the hull and to maneuver the robot about the hull.

In the examples shown, turbines 26a and 26b drive generators 28a and 28b, respectively. Turbines 26a and 26b are driven by water flowing past the vessel hull when the vessel is underway. Generators 28a and 28b recharge a power source such as a battery. One or more motors are powered by the power source. An electronic controller is also powered by the power source as is a navigation processor and various sensors and other electronic subsystems.

FIG. 1 also shows motor 30 driving turret 24. Motor 30 is powered by the power source and is controlled by an electronic subsystem or controller. Motor 30 drives worm gear 32 engaged with peripheral gear 34 on turret 24. Turret 24 rotates with respect to the hull via a shaft or the like. Other actuator systems for adjusting the position of turret 24 are possible. In this way, as the robot turns via drive system 22, turbines 26a and 26b can be kept in alignment with the flow of water past the hull.

Typically, other subsystems are included as components of the robot, for example, a communication subsystem, and the like. Preferably robot body 12 need not be tethered to any kind of an on-board power or control subsystem. The turbine subsystem can operate the drive subsystem (and, in one example, a cleaning subsystem) directly or via a generator charging a power subsystem (e.g., a battery pack) which supplies power to one or more motors driving the drive subsystem and/or the cleaning subsystem. The battery pack can also be used to energize the other electronic and/or electromechanical subsystems associated with the robot. It is also possible for a generator to drive one or more motors directly.

Drive system 22 in this particular example includes frame 40 with spaced side walls 42a and 42b interconnected by end walls 44a and 44b. Spaced axles 48a and 48b, in this example, are rotatably disposed between side walls 42a and 42b such that frame 40 defines first frame portion or section 50a housing axle 48a and second frame portion 50b housing axle 48b. Axles 48a, 48b support, in this particular example, wheels such as spaced magnetic wheels 52a and 52b on axle 48a and spaced wheels 52c and 52d on axle 48b. By wheels, as disclosed herein, we mean wheels in the conventional sense, drum shaped wheels (also referred to as rollers), and even a pair of spaced wheels, drums, or sprockets used, for example, in a magnetic track, and other rolling structures. For example, as disclosed herein, axle 48b can support a drum type wheel or there may be two spaced axles supported by frame section 50b supporting spaced drums or sprockets for a magnetic track housed by frame section 50b. The same is true with respect to frame section 50a.

Frame 40 defines pivotable, bendable, or flexible joint 54 between frame portion 50a and frame portion 50b. Stated another way, frame 40 includes expandable and contractible portion 56 between frame portions 50a and 50b. In this particular example, pivotable joint 54 is a section of frame side wall 72b and expandable portion 56 comprises a gap in frame 40 side wall 42a and a gap in top wall 58 between metal frame portions 50a and 50b. Pivotable or flexible joint 54, in this particular example, is a portion of the frame which can be bent when desired. Flexible joint 54 spans gap 56 which narrows from a wide end in side wall 42b to a narrower end near side wall 42a. Joint 54 is, in this example, a locally flexible integral portion of an otherwise stiff frame side wall 42b and top wall 58 and can bend a few degrees.

Actuator subsystem 60 is configured to move frame portion 50a relative to frame portion 50b and flex joint 54 while expanding and contracting expandable frame gap 56. This action, in turn, angles first axle 48a relative to second axle 48b and turns the drive and the robot it is attached to. In one example, if the axles are a foot apart, the turning radius can be between 5 to 40 feet which is sufficient for operation on the hull of a ship.

In this particular example, the actuator subsystem includes a shaft with threads extending into a threaded orifice in frame portion 50a and threads on the other end extending into a threaded orifice in frame portion 50b. The threads are in different directions so turning the shaft in one direction expands gap 56 and turning the shaft in the opposite direction contracts gap 56. To reduce any stress on the shaft, rotating barrel nuts may be incorporated in the frame portions, to receive the threads on the opposite ends of the shaft.

A piston driven in and out of a cylinder is coupled to the shaft via a pivoting joint. In this way, actuating the cylinder rotates the shaft. The cylinder is typically coupled to the frame at or near joint 54. The combination of the cylinder and the piston may be an electrically driven linear actuator as is known in the art or a pneumatically drive subsystem as is also known in the art. See the co-pending application by the applicant hereof entitled HULL ROBOT STEERING SYSTEM filed on May 10, 2010, application Ser. No. 12/800,174.

Other robot drive/turning subsystems, however, are possible. For example, two magnetic tracks can be used and then steering is possible by operating one track at a different speed than the other track. See also patent application Ser. Nos. 12/313,643; 12/583,346; and 12/587,949 incorporated herein by this reference.

Figure 2:
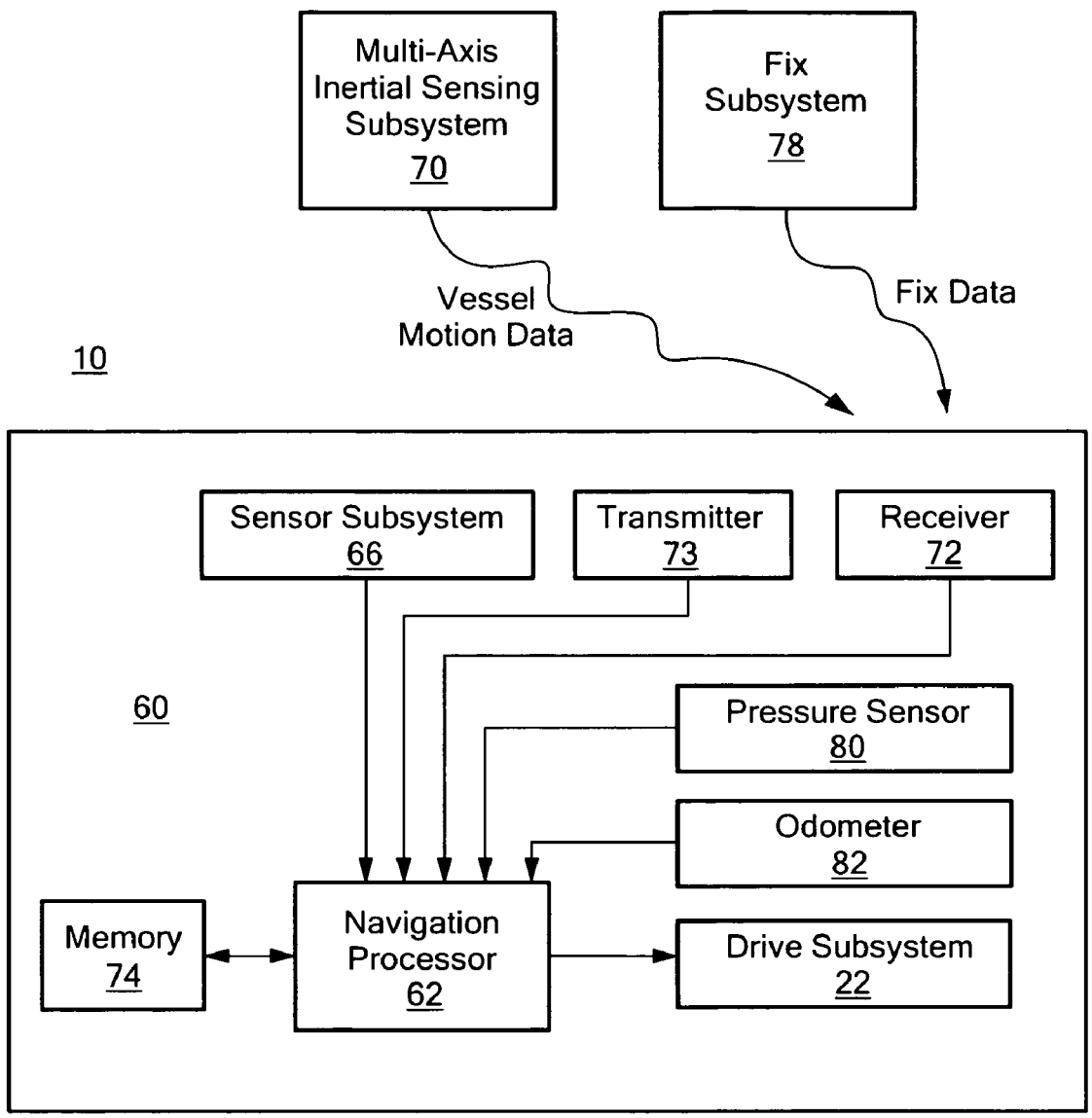
FIG. 2 is a block diagram showing the primary components associated with a navigation subsystem for a hull robot.

Navigation subsystem 60, FIG. 2, via navigation processor 62, provides an output to drive subsystem 22 to control forward and backward motion of the robot and to steer the robot on the hull. Navigation subsystem 60 as well as the other electronic subsystems of the robot may be housed in sealed housing 13, FIG. 1.

Sensor subsystem 66 onboard robot 10 typically includes a multi-axis sensing system (such as provided by Systron Donner, Analog Devices, MicroStrain, and Gladiator Technologies). Since both the robot and the hull are moving, sensor subsystem 66 outputs data to navigation processor 62 reflecting a combination of the motion of the robot on the vessel hull and the motion of the vessel hull itself.

To address this situation, there are means for determining vessel motion, for example, a multi-axis sensing system 70 on the vessel which transmits vessel motion data to navigation subsystem processor 62 via receiver 72. Processor 62 is then configured (e.g., programmed) to subtract or cancel vessel motion from the data obtained from sensor subsystem 66 (data reflecting combined robot and vessel motion). The result is data concerning only the motion of the robot on the vessel hull. Based on the robot motion data, the position of the robot on the hull can be ascertained.

In another example, processor 62 is programmed to control drive subsystem 64 to periodically stop the robot on the hull. Then, the output of sensor subsystem 66 is data concerning motion of the vessel only. This data can be stored in memory 74. When the robot again maneuvers on the hull, this data is subtracted from the output of sensor subsystem 66 to derive data concerning movement of the robot.

Thus, means for determining vessel motion may include either a sensing subsystem 70 on-board the vessel and/or sensor subsystem 66 of the robot when the robot is not moving. Vessel motion data, in one example, can be output by both subsystem 70 and subsystem 66 and compared to verify both subsystems and to compensate for any errors or differences between the two subsystems. Typically, the periodicity motion of the large vessels does not change too often so updates to the vessel motion data stored in memory 74 may need to only occur periodically.

To provide calibration data, fix subsystem 78 is also typically provided to more accurately determine the position of the robot on the vessel hull. In one example, fix subsystem 78 includes two spaced transmitters on the vessel each transmitting to robot receiver 72 signals which can be uniquely identified by navigation processor 62. Navigation processor 62 is then programmed to use triangulation techniques to determine a position fix of the robot relative to the two transmitters whose position is known. The position of the robot is thus determined and stored in memory 74. Sensor subsystem 66 then determines the movement of the robot as described above and calculates the position of the robot based on the position fix data and the movement of the robot.

Typically, the fix data from fix subsystem 78 and the vessel motion data from multi-axis sensing subsystem 70 are provided to receiver 72 of robot 10 when robot 10 is maneuvered above the water line on the hull so that RF transmissions can be used. Thus, navigation processor 62 is configured to periodically control drive subsystem 22 to maneuver robot 10 above the water line. Pressure sensor 80 may be included to verify that the robot is above the water line.

Memory 74 also typically includes data concerning the configuration of the hull and an input desired path of travel for the robot about the hull. Navigation processor 62, based on this data and the derivation of the robot's motion, then controls drive subsystem 22 to maneuver the robot about the hull according to the desired path of travel.

For example, suppose that at time $T_1$, the fix data indicates that the robot is at position $X_n$, $Y_n$, and $Z_n$ on the hull. The stored intended path of the travel for the robot is to first maneuver to position $X_1$, $Y_1$, and $Z_1$ according to the desired path of travel for the robot.

The position of the robot $X_n$, $Y_n$, and $Z_n$ can be expressed as $R_o$, $\Phi_o$, and $\theta_o$ and $X_1$, $Y_1$, and $Z_1$ can be expressed as point P ($R_1$, $\Phi_o$, and $\theta_o$). As the robot traverses the hull to position P, odometer 82, FIG. 2 determines R and sensor subsystem 66 determines $\Phi$ and $\theta$ of both the robot and the vessel. Navigation processor 62 subtracts the vessel's motion from this combined data and determines $\Phi$ and $\theta$ for the robot.

The robot is programmed, via the desired path of travel stored in memory 74, to traverse the hull for a distance R at angles $\Phi$ and $\theta$. Navigation processor 62 then issues course corrections to drive subsystem 22 based on the output of sensor subsystem 66 and odometer 82.

Figure 3:
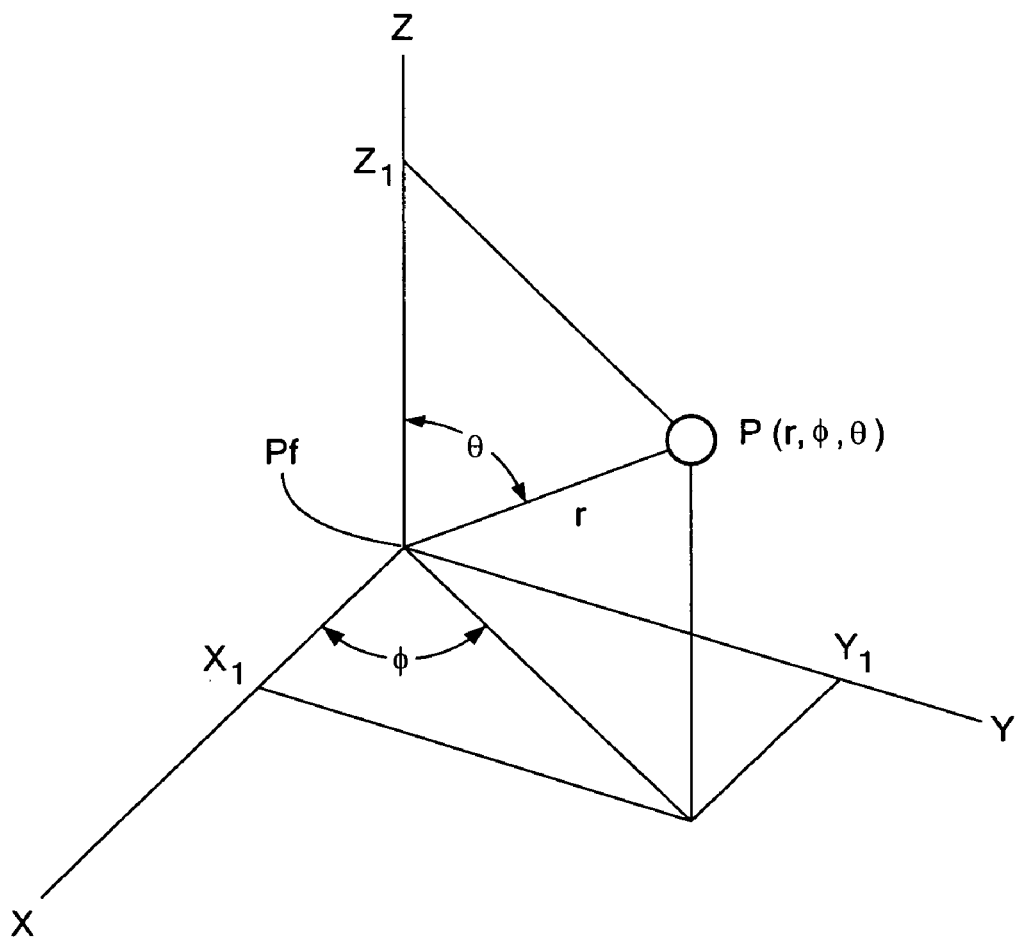
FIG. 3 is a depiction of the method of determining the coordinates of a point in space from an origin in accordance with the invention.

The polar coordinate system or the spherical coordinate system involves the distance from the origin 0 and two angles $\theta$ and $\Phi$ as shown in FIG. 3.

The position of point P is described as (r, $\Phi$, $\theta$), where r=the distance from the origin (O), $\Phi$=the horizontal azimuth angle measured on the XY plane from the X axis in the counter-clockwise direction, and $\theta$=the azimuth angle measured from the Z axis. The origin is typically determined, at least initially, via the fix subsystem described above.

The range of $\Phi$ is from 0 to $2\pi$ (360), and the range of $\theta$ is from 0 to $\pi$ (180°).

To transform from Cartesian to Spherical coordinates and vice versa, trigonometry is used to establish the transformation equations:

$$X_1 = r \sin\theta \cos\phi \tag{1}$$

$$Y_1 = r \sin\theta \sin\phi \tag{2}$$

$$Z_1 = r \cos\theta \tag{3}$$

$$r = (X_1^2 + Y_1^2 + Z_1^2)^{1/2} \tag{4}$$

$$\theta = \tan^{-1}(Z_1/(X_1^2+Y_1^2)^{1/2}), \text{ and} \tag{5}$$

$$\phi = \tan^{-1}(Y_1/X_1). \tag{6}$$

In a polar coordinate system, if the robot starts a calibration fix point $P_f$ for any measured r, $\theta$, $\Phi$, or X, Y, Z position can be determined from the relations above.

In operation, the robot will typically include a three-dimensional map of the hull stored in memory 74, FIG. 2. The robot will start at a calibration fix point $P_f(X_n, Y_n, Z_n)$, FIG. 3. With the map of the ship's hull in memory, and the capability to measure $\theta$, $\Phi$, or r, the robot travels according to a pre-programmed course. As it travels along the hull, sensing subsystem 66 measures $\theta$ and $\Phi$.) Odometer 82 measures r. This measured data is compared to the programmed position input by the user, e.g., the desired path of travel for the robot. If there is a difference, the course is corrected by the difference, which can be represented in polar coordinates by $$P_{program}(r,\Phi,\theta) - P_{measured}(r,\Phi,\theta) = \text{course correction}(r, \Phi,\theta) \tag{7}$$

$P_{program}$ (r, $\Phi$, $\theta$) is the location where the robot is supposed to be according to the inputted desired path of travel and $P_{measured}$ (r, $\Phi$, $\theta$) is the actual measured location both referenced from the same starting point $(X_n, Y_n, Z_n)$. With the transformation equations above, the course correction equation can also be represented in Cartesian coordinates.

Because the robot will be navigating on a moving platform that has angular movement about X, Y, Z axes, it will often be necessary to determine this angular motion of the platform so that such motion does not corrupt the actual position angular measurements $\Phi$ and $\theta$.

Removing the platform's angular motion can be accomplished in a variety of ways. One way is to stop the robot and measure this angular movement and store it. Once the robot begins moving again, the unwanted angular motion can be subtracted. Another way is to include a multi-axis sensing system 70 located on the moving platform used to continuously measure the platform's angular motion and remotely provide this information to the robot as shown in FIG. 2. Processor 62 can then subtract the unwanted angular motion before it calculates a course correction. In either case, the subtraction can be accomplished by three-dimensional vector subtraction.

Figure 4A:
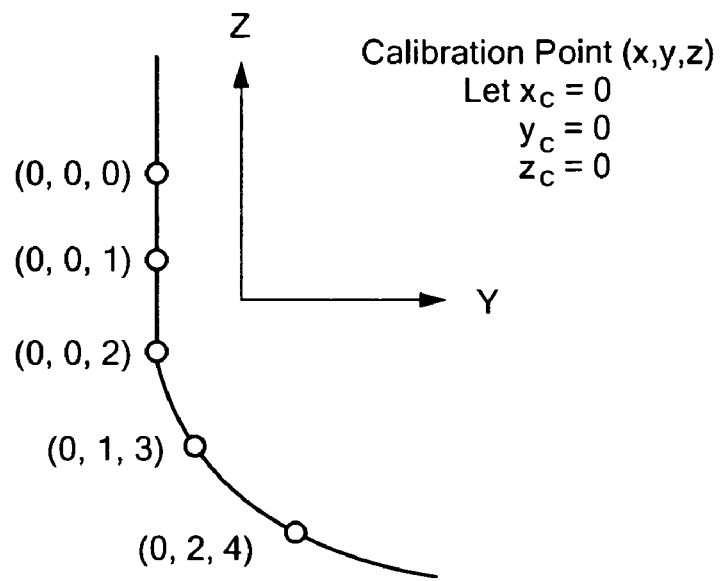
FIGS. 4A-4B are plots showing how the motion of the ship is determined in accordance with the invention.
Figure 4B:
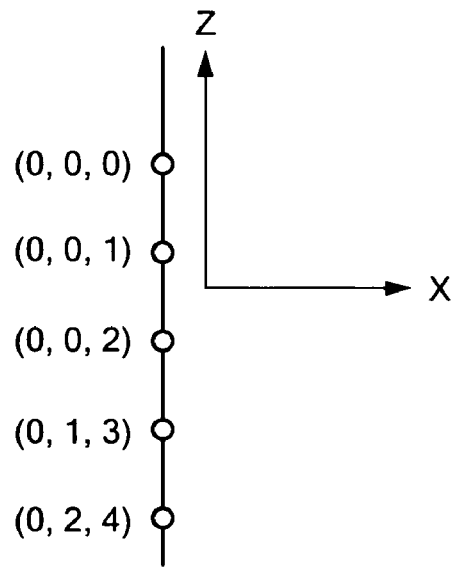

As an example of operation, assume the robot is on the preprogrammed course shown in FIG. 4 starting at the known position (0, 0, 0) and moving towards (0, 2, 4), the desired position. In this path X is always zero and the robot is moving only in the Z and Y directions. Assume that as the robot travels from (0, 0, 1) to (0, 0, 2), somehow it ends up at location (0.5, 0, 2).

In real time, multi-axis sensing system 66, FIG. 2 is measuring angular rotation about each axis and the angular information is translated into θ and φ. In the above case where X is always zero, there is no angular rotation about the Z axis and φ=90°. The angle θ=0° as long as Y is zero (0). As Y becomes greater than zero, θ will vary between 0 and 90°. The measured data is derived from the equations (1)-(3) above where, θ and φ are provided by multi-axis sensing system 66 and r is provided by odometer 22.

If the path is skewed, the robot is at position (0.5, 0, 2) instead of at the desired position (0, 0, 2). The navigation's multi-axis sensing system is now measuring angular rotation about the Z axis and angle θ is now less than 90°. Navigation processor will course correct the robot's path until X is once again zero. This process continuously monitors the desired position and compares it to the actual and course adjustments are made until $$(x,y,z)_{program} - (x,y,z)_{measured} = 0 \quad (8)$$

or $$P_{program}(r,\Phi,\theta) - P_{measured}(r,\Phi,\theta) = 0. \quad (9)$$

Figure 5:
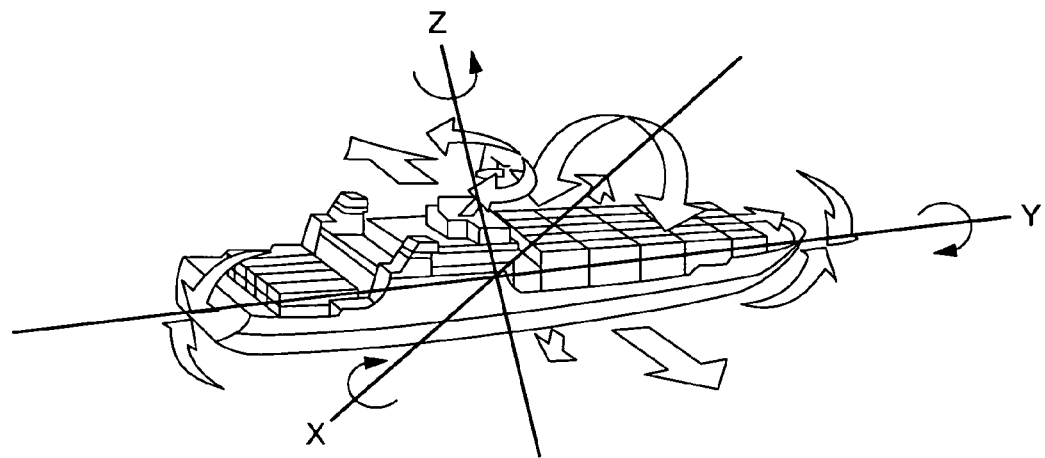
FIG. 5 is a schematic depiction showing movement of a vessel.

Under some operating conditions, the robot will be moving and navigating on a ship that will be subjected to sea state conditions. Sea state conditions will cause the ship to pitch, roll and yaw and is shown in FIG. 5.

The ship's motion will cause multi-axis sensing system 66, FIG. 2 onboard the robot to report both the motion of both the robot and ship. To maintain the robot's navigation accuracy, the ship's motion needs to be accounted for and removed.

If a multi-axis sensing system 70, is placed on the ship, as the ship pitches, rolls and yaws, the multi-axis sensing system will measure the angular rotation about each axis in degrees per second. This information can then be transmitted to the robot as shown in FIG. 2 (for example when the robot receives fix data) where it will be accounted for and removed from the reported angular rotation onboard the robot. For example, if ship's motion is causing the following angular rotation:

$$X\text{-axis } 0.1°/\text{sec}, Y\text{-axis } 0.01°/\text{sec}, Z\text{-axis } 0°/\text{sec}, \quad (10)$$

the robot's speed and course and at a given point should have the angular rotation:

$$X\text{-axis } 0.0°/\text{sec}, Y\text{-axis } 0.05°/\text{sec}, Z\text{-axis } 0°/\text{sec} \quad (11)$$

In this example, assuming the angular motion of the ship and robot is in the same direction, then the combined angular motion measured by the robot is:

$$X\text{-axis } 0.1°/\text{sec}, Y\text{-axis } 0.06°/\text{sec}, Z\text{-axis } 0°/\text{sec} \quad (12)$$

The ships motion would then be subtracted resulting in the desired angular motion shown in equation (11).

An alternative approach is to have the robot periodically stop moving. When the robot is not moving, onboard multi-axis sensing system 66 will now be measuring the ship's motion only. This motion can then be zeroed or stored and subtracted as robot navigates about the hull.

In this case, ship's motion as stated above, is:

$$X\text{-axis } 0.1°/\text{sec}, Y\text{-axis } 0.01°/\text{sec}, Z\text{-axis } 0°/\text{sec}, \quad (13)$$

and would be zeroed or calibrated out of the robot's navigation measurement system.

Figure 6:
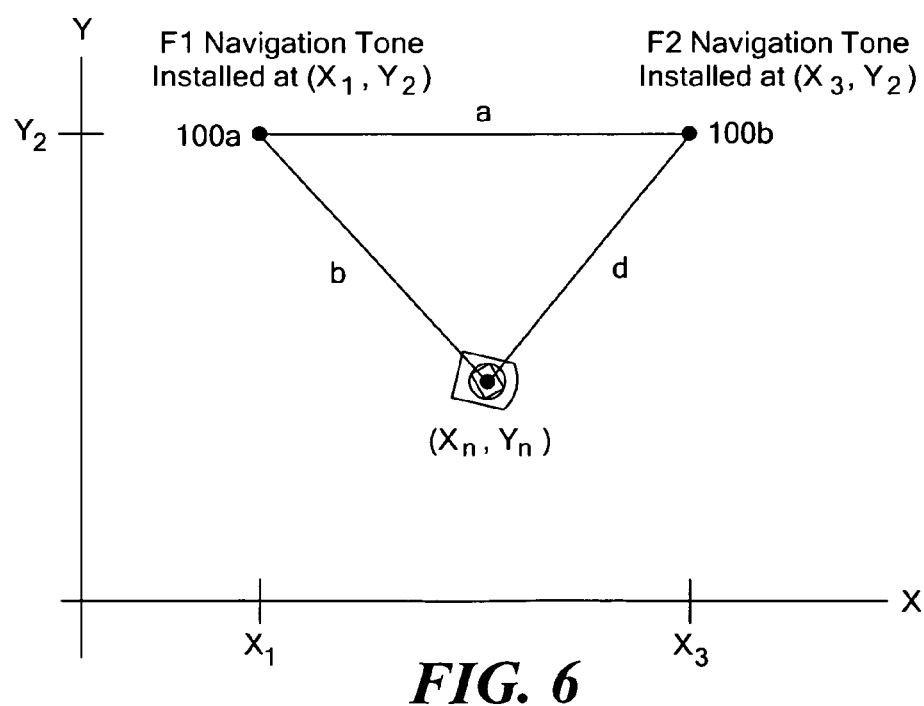
FIG. 6 is a depiction showing how a robot position fix is determined in accordance with the invention.

FIG. 6 depicts the operation of an exemplary subsystem. The robot is at position $Y_N$, $X_N$ on the ship's hull, typically above the water line, and transmitters 100a and 100b are fixed at known locations on the ship's hull. The distance A between transmitters 100a and 100b is a known value. Distances b and d are determined by the following calculations.

$$X_n = X_3 - \frac{a^2 + d^2 - b^2}{2a} \quad (14)$$

$$Y_n = Y_2 - \sqrt{d^2} - \frac{(a^2 + d^2 - b^2)^2}{4a^2} \quad (15)$$

The distance a is X3–X1

The distances b and d are determined by:

At time $t=t_0$, frequency source F3T on board the robot transmits,

At time $t=t_0+t_{1F1R}$, F1R receives F3T signal and

At time $t=t_0+t_{1F2R}$, F2R receives F3T signal,

At time $t=t_0+t_{1F1R}+t_{2F1T}$, F1T transmits a signal and

At time $t=t_0+t_{1F2R}+t_{2F2T}$, F2T transmits a signal,

At time $t=t_0+t_{1F1R}+t_{2F1T}+t_{2F3R}$, F3R receives F1T signal and

At time $t=t_0+t_{1F2R}\,t_{2F2T}\,t_{2F3R}$, F3R receives F2T signal

Figure 7:
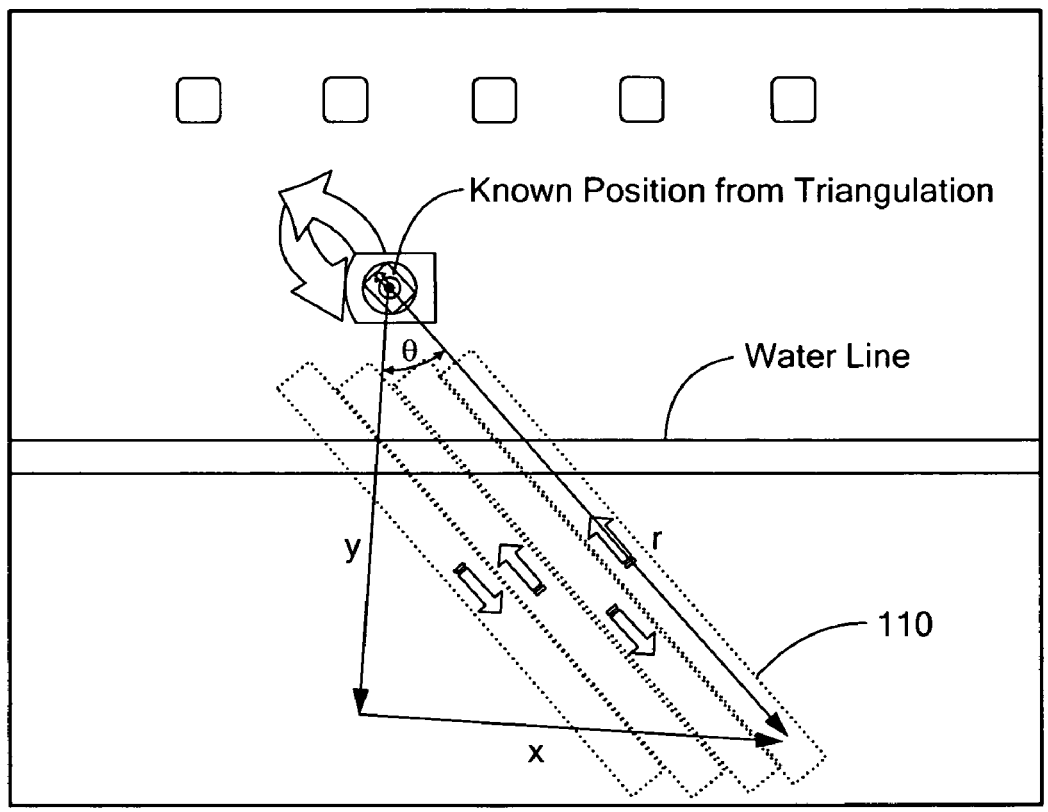
FIG. 7 is a view showing a robot in position on the vessel hull above the water line in order to receive position fix data.

Therefore, $b=[(t_0+t_{1F1R}+t_{2F1T}+t_{2F3R}))/2]c$, and $d=[(t_0+t_{1F2R}+t_{2F2T}+t_{2F3R})/2]c$ C=speed of light As shown in FIG. 7, every time the robot reaches the surface, a frequency tone is emitted from the robot from transmitter 73, FIG. 2 onboard the robot causing the frequency sources on the hull to each transmit a unique frequency at known locations on the hull. Radio triangulation is then used to more accurately determine where the robot is on the hull. The robot's known (calibrated) position fix is then the starting point of a stored pre-programmed cleaning path. As the robot traverses the hull, sensor 66, FIG. 2 and odometer 82 continually measure the robot's location using the algorithm discussed above. This process is repeated as the robot travels from bow to stern according to the cleaning path depicted in FIG. 7 at 110.

Figure 8:
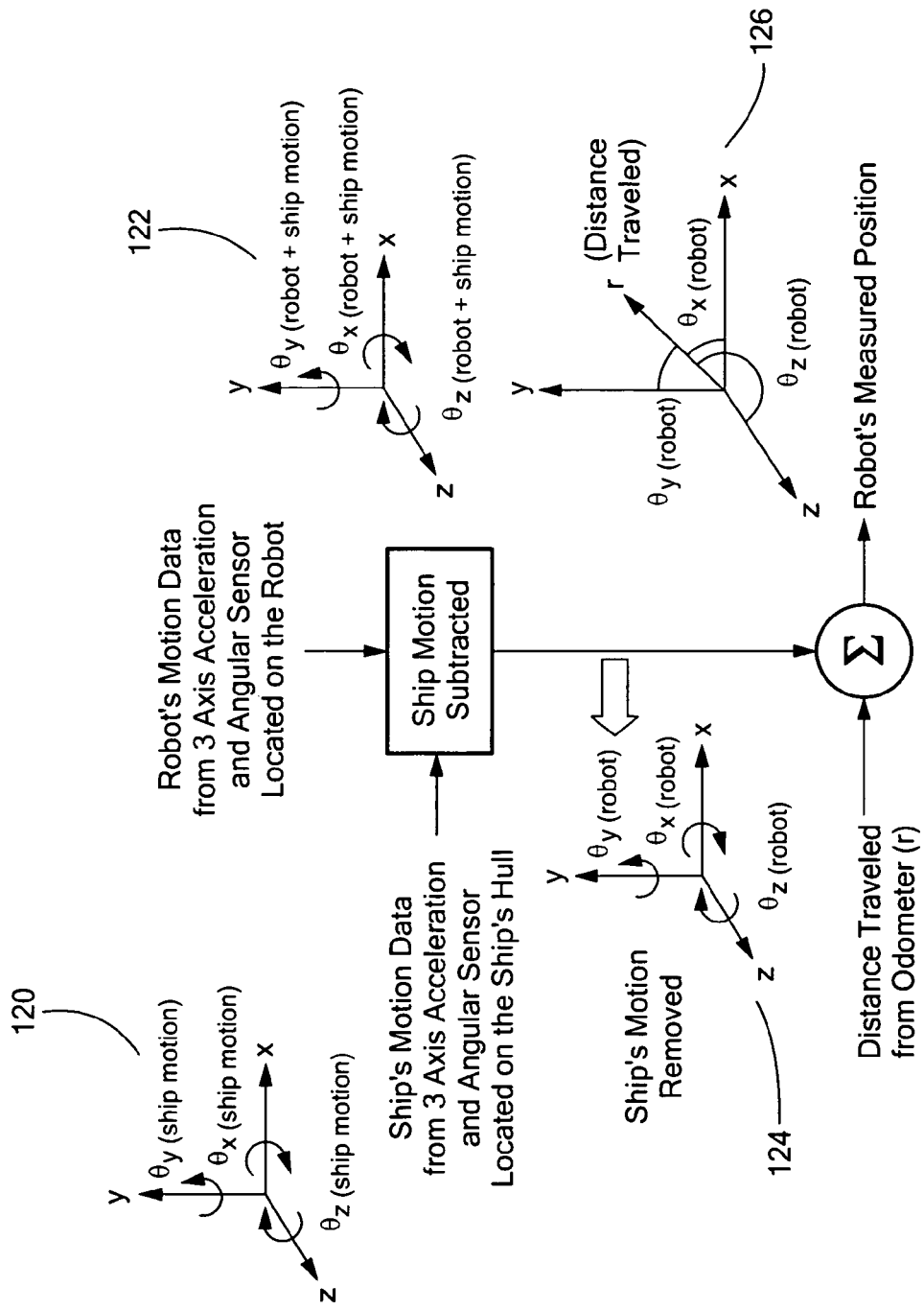
FIG. 8 is a flow chart depicting the primary steps involved in determining the position of a robot on the vessel hull by canceling, from the sensor subsystem output data combining both robot and vessel motion, the determined vessel motion.

FIG. 8 shows ship's vessel motion data at 120 (based on, for example, sensing subsystem 70, FIG. 2) subtracted from robot motion data as shown at 122 (also including ship motion data as discussed above for the output from sensor subsystem 66, FIG. 2. With the ship's motion removed as shown at 124 and also based on the distance traveled as output from odometer 82, FIG. 2, the robot's measured position is shown at 126 in FIG. 8.

Figure 9:
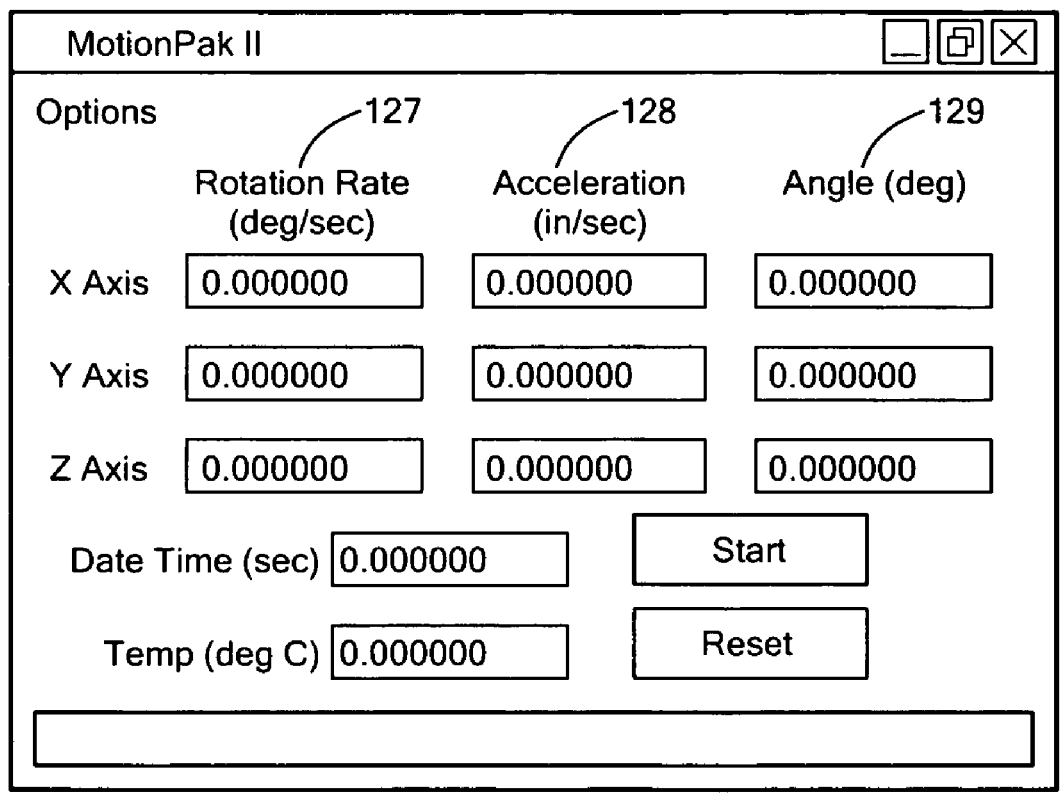
FIG. 9 is a view showing the output of an inertial sensor used in an example of the invention.

FIG. 9 shows the typical output of both sensor subsystems 66 and 70, FIG. 2, in this example, the rotation rate 127 for all three axes, and the acceleration 128, and angle 129 for all three axes.

Figure 10:
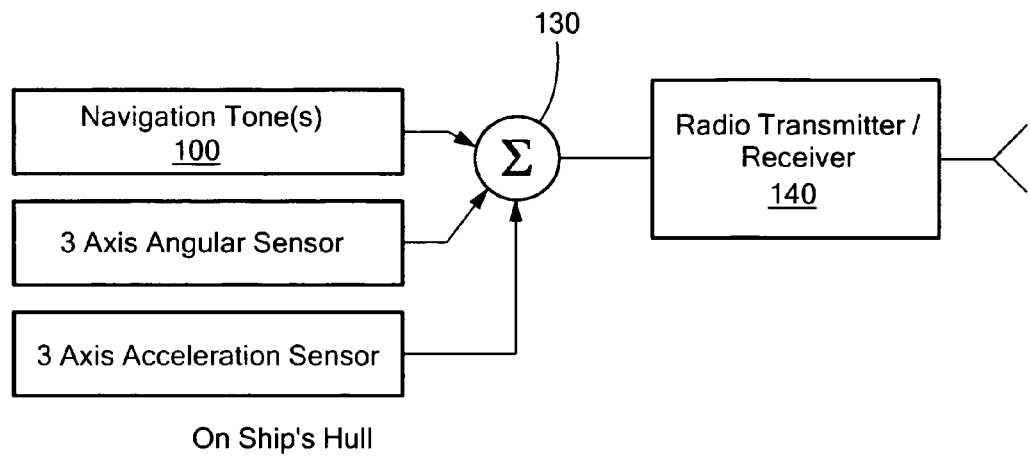
FIG. 10 is a block diagram depicting the primary components located on the vessel hull associated with a navigation subsystem in accordance with the invention.
Figure 11:
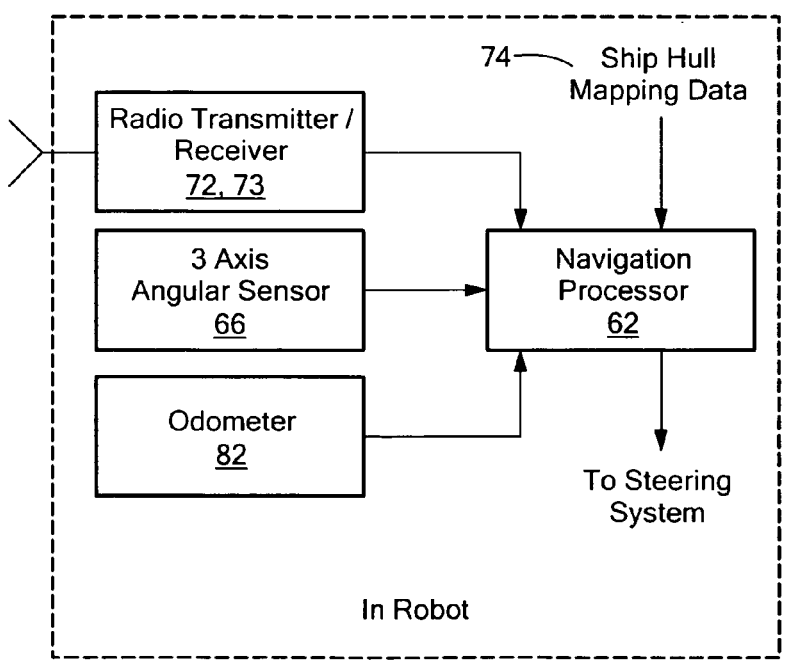
FIG. 11 is a block diagram showing, in one example, the primary navigation subsystem components located onboard the robot in accordance with the invention.

In one preferred embodiment, the data from the navigation transmitters 100 on the vessel hull, and data from the angular sensor and the acceleration sensor onboard the ship's hull are combined as shown at 130, FIG. 10 and transmitted via transmitter 140. Receiver 72 and transmitter 73 onboard the robot (or alternatively a transmitter/receiver combination or transceiver) provides this data to navigation processor 62. Data from sensor subsystem 66 and odometer 82 is used by navigation processor 62 in addition to the ship hull mapping data and the intended programmed path of the robot as shown at 74 in order to control drive/steering subsystem the drive/steering subsystem.

Figure 12:
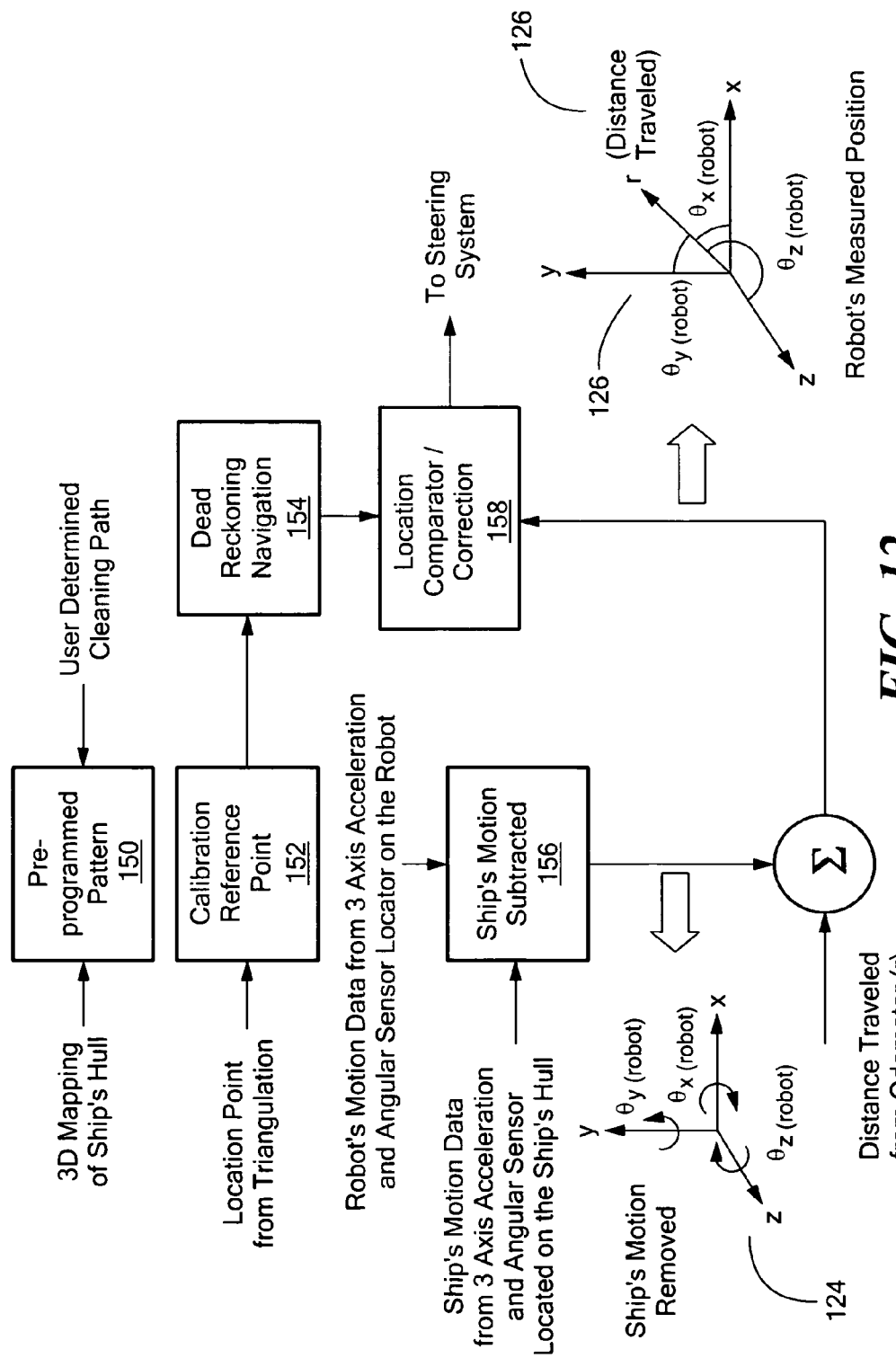
FIG. 12 is a flow chart depicting the operation of and the primary steps associated with the programming of the navigation processor in accordance with an example of the invention.

Thus, the operation of navigation processor 62 includes determining a pre-programmed cleaning or inspection pattern, step 150, FIG. 12 based on data stored in memory 74 as well as a user determined path also stored in memory 74. A calibration reference point as shown at step 152 is determined based on the triangulation technique described above. Navigation processor 63 controls the drive subsystem to navigate the robot based on dead reckoning step 152. At step 156, the ship's motion is subtracted from the onboard sensor subsystem output data and, with the vessel's motion removed, in combination of the distance traveled as measured via odometer 82, navigation processor 62 at step 158 determines the robot's location and provides course corrections as needed to a drive subsystem.

In this way, shifts in the robot's position on the hull are accounted for and any inaccuracies inherent in the navigation subsystem is addressed by periodically maneuvering the robot to a position on the hull to receive position fix calibration data. To account for the motion of the vessel while it is underway, the robot is also programmed to subtract the motion of the vessel from its navigation calculations. In this way, the robot's position on the hull once it leaves the position calibration fix point can be determined. The result is a lower cost, lower power navigation subsystem.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A vessel hull robot navigation subsystem comprising:
    a drive subsystem onboard the robot for driving and maneuvering the robot about the hull, wherein the robot is adapted to move and navigate about the vessel and is subject to sea state conditions while the vessel is underway;
    a sensor subsystem onboard the robot outputting data combining robot and vessel motion;
    a memory onboard the robot including data concerning the configuration of the hull and a desired path of travel for the robot; a fix subsystem communicating position fix data to the robot;
    means for determining vessel motion; and
    a navigation processor onboard the robot and responsive to the memory data, the sensor subsystem, the position fix data, and the means for determining the vessel motion, the navigation processor configured to:
    determine the position of the robot on the hull by canceling, from the sensor subsystem output data combining both robot and vessel motion, the determined vessel motion to maintain navigation accuracy of the robot, and
    control the drive subsystem to maneuver the robot on the hull based on the fix data, the configuration of the hull, the desired path of travel for the robot, and the determined position of the robot on the hull.

2. The vessel hull robot navigation subsystem of claim 1 in which the navigation processor is furthered configured to control the drive subsystem to periodically maneuver the robot above the water line to receive the position fix data.

3. The vessel hull robot navigation subsystem of claim 2 in which the robot further includes a pressure sensor for detecting when the robot is above the water line.

4. The vessel hull robot navigation subsystem of claim 2 in which the fix subsystem includes at least two hull transmitters and a receiver onboard the robot receiving transmissions from the at least two hull transmitters, the navigation processor responsive to the receiver and configured to determine, by triangulation, robot position fix data based on the transmissions transmitted by the at least two hull transmitters.

5. The vessel hull robot navigation subsystem of claim 1 in which the means for determining vessel motion includes a multi-axis sensing subsystem on the vessel outputting data representing motion of the vessel, a transmitter on the vessel for transmitting said data, and a receiver on the robot for receiving said data.

6. The vessel hull robot navigation subsystem of claim 1 in which the means for determining vessel motion includes the sensor onboard the robot outputting vessel motion data alone when the robot is not moving, the navigation processor configured to periodically stop movement of the robot to acquire the vessel motion data.

7. The vessel hull robot navigation subsystem of claim 1 in which the sensor subsystem onboard the robot further includes an odometer for determining the distance traveled by the robot.

8. The vessel hull robot navigation subsystem of claim 1 in which the sensor subsystem is configured to output angular rotations about a plurality of axes and position angles with respect to a plurality of axes.

9. A vessel hull robot navigation subsystem comprising:
    a drive subsystem onboard the robot for driving the robot about the hull, wherein the robot is adapted to move and navigate about the vessel and is subject to sea state conditions while the vessel is underway;
    a sensor subsystem onboard the robot outputting robot motion data;
    a memory onboard the robot including data concerning the configuration of the hull and a desired path of travel for the robot;
    a fix subsystem communicating position fix data to the robot; and
    a navigation processor onboard the robot and responsive to the memory data, the sensor subsystem, and the position fix data, the navigation processor configured to control the drive subsystem to maneuver the robot on the hull based on the fix data, the configuration of the hull, the desired path of travel for the robot, and the determined position of the robot on the hull, wherein the navigation processor is furthered configured to control the drive subsystem to periodically maneuver the robot above the water line to receive the position fix data.

10. The vessel hull robot navigation subsystem of claim 9 further including means for determining vessel motion and the navigation processor is configured to determine the position of the robot on the hull by canceling, from the sensor subsystem output, determined vessel motion.

11. The vessel hull robot navigation subsystem of claim 1 in which the robot further includes a pressure sensor for detecting when the robot is above the water line.

12. The vessel hull robot navigation subsystem of claim 9 in which the fix subsystem includes at least two hull transmitters and a receiver onboard the robot receiving transmissions from the at least two hull transmitters, the navigation processor responsive to the receiver and configured to determine, by triangulation, robot position fix data based on the transmissions transmitted by the at least two hull transmitters.

13. A vessel hull robot navigation subsystem comprising:
a drive subsystem onboard the robot for driving the robot about the hull, wherein the robot is adapted to move and navigate about the vessel and is subject to sea state conditions while the vessel is underway;
a sensor subsystem onboard the robot outputting data combining robot and vessel motion;
a memory onboard the robot including data concerning the configuration of the hull and a desired path of travel for the robot;
means for determining vessel motion comprising a multi-axis sensing subsystem on the vessel outputting data representing motion of the vessel, a transmitter on the vessel for transmitting said data, and a receiver on the robot for receiving said data; and
a navigation processor onboard the robot and responsive to the memory data, the sensor subsystem, and the means for determining the vessel motion, the navigation processor configured to:
determine the position of the robot on the hull by canceling, from the sensor subsystem output data combining both robot and vessel motion, the determined vessel motion to maintain navigation accuracy of the robot, and
control the drive subsystem to maneuver the robot on the hull based on the configuration of the hull and the desired path of travel for the robot, and the determined position of the robot on the hull.

14. The vessel hull robot navigation subsystem of claim 13 further including a fix subsystem communication position fix data to the robot, the navigation processor onboard the robot responsive to the position fix data and further configured to control the drive subsystem to maneuver the robot on the hull based on the fix data.

15. The vessel hull robot navigation subsystem of claim 14 in which the navigation processor is furthered configured to control the drive subsystem to periodically maneuver the robot above the water line to receive the position fix data.

16. The vessel hull robot navigation subsystem of claim 15 in which the robot further includes a pressure sensor for detecting when the robot is above the water line.

17. The vessel hull robot navigation subsystem of claim 14 in which the fix subsystem includes at least two hull transmitters and a receiver onboard the robot receiving transmissions from the at least two hull transmitters, the navigation processor responsive to the receiver and configured to determine, by triangulation, robot position fix data based on the transmissions transmitted by the at least two hull transmitters.

18. The vessel hull robot navigation subsystem of claim 13 in which the sensor subsystem onboard the robot further includes an odometer for determining the distance traveled by the robot.

19. The vessel hull robot navigation subsystem of claim 13 in which the sensor subsystem is configured to output angular rotations about a plurality of axes and position angles with respect to a plurality of axes.

20. A vessel hull robot navigation subsystem comprising:
a drive subsystem onboard the robot for driving the robot about the hull, wherein the robot is adapted to move and navigate about the vessel and is subject to sea state conditions while the vessel is underway;
a sensor subsystem onboard the robot outputting data combining robot and vessel motion; a fix subsystem communication position fix data to the robot;
means for determining vessel motion; and
a navigation processor onboard the robot and responsive to the sensor subsystem, the position fix data, and the means for determining the vessel motion, the navigation processor configured to:
determine the position of the robot on the hull by canceling, from the sensor subsystem output data combining both robot and vessel motion, the determined vessel motion to maintain navigation accuracy of the robot, and
control the drive subsystem to maneuver the robot on the hull based on the fix data and the determined position of the robot on the hull.

21. The vessel hull robot navigation subsystem of claim 20 further including a memory onboard the robot including data concerning the configuration of the hull and a desired path of travel for the robot, the navigation processor responsive to the memory data and configured to control the drive subsystem to maneuver the robot based on the configuration of the hull and the desired path of travel for the robot.

22. A vessel hull robot navigation subsystem, comprising:
a drive subsystem onboard the robot for driving the robot about the hull, wherein the robot is adapted to move and navigate about the vessel and is subject to sea state conditions while the vessel is underway;
a sensor subsystem onboard the robot outputting data combining robot and vessel motion;
a memory onboard the robot including data concerning the configuration of the hull and a desired path of travel for the robot;
means for determining vessel motion comprising the sensor onboard the robot outputting vessel motion data alone when the robot is not moving, the navigation processor configured to periodically stop movement of the robot to acquire the vessel motion data; and
a navigation processor onboard the robot and responsive to the memory data, the sensor subsystem, and the means for determining the vessel motion, the navigation processor configured to:
determine the position of the robot on the hull by canceling, from the sensor subsystem output data combining both robot and vessel motion, the determined vessel motion to maintain navigation accuracy of the robot, and
control the drive subsystem to maneuver the robot on the hull based on the configuration of the hull and the desired path of travel for the robot, and the determined position of the robot on the hull.

\* \* \* \* \*